United States Patent
Dudda et al.

(10) Patent No.: US 11,057,792 B2
(45) Date of Patent: Jul. 6, 2021

(54) METHOD, SYSTEM AND DEVICE FOR PROVIDING FLOW CONTROL IN A SPLIT BEARER ENVIRONMENT

(71) Applicant: Telefonaktiebolaget LM Ericsson (publ), Stockholm (SE)

(72) Inventors: Torsten Dudda, Aachen (DE); John Camilo Solano Arenas, Dusseldorf (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 109 days.

(21) Appl. No.: 15/773,331

(22) PCT Filed: Nov. 1, 2016

(86) PCT No.: PCT/EP2016/076286
§ 371 (c)(1),
(2) Date: May 3, 2018

(87) PCT Pub. No.: WO2017/076826
PCT Pub. Date: May 11, 2017

(65) Prior Publication Data
US 2018/0332496 A1 Nov. 15, 2018

Related U.S. Application Data

(60) Provisional application No. 62/250,602, filed on Nov. 4, 2015.

(51) Int. Cl.
*H04W 28/02* (2009.01)
*H04W 28/08* (2009.01)
(Continued)

(52) U.S. Cl.
CPC ....... *H04W 28/0236* (2013.01); *H04W 28/08* (2013.01); *H04W 28/12* (2013.01); *H04W 28/14* (2013.01)

(58) Field of Classification Search
CPC . H04W 28/0236; H04W 76/15; H04W 28/08; H04W 28/12; H04W 28/14; H04W 16/14; H04W 72/0453
See application file for complete search history.

(56) References Cited

U.S. PATENT DOCUMENTS

2005/0076390 A1 * 4/2005 Klausberger ......... H04N 9/8042
725/134
2005/0267985 A1 * 12/2005 Ji ........................... H04L 45/00
709/238
(Continued)

FOREIGN PATENT DOCUMENTS

EP 2854444 A1 4/2015
WO WO-2014084767 A1 * 6/2014

OTHER PUBLICATIONS

3GPP, "3rd Generation Partnership Project; Technical Specification Group Radio Access Network; Evolved Universal Terrestrial Radio Access Network (E-UTRAN); X2 interface user plane protocol (Release 12)", 3GPP TS 36.425 V12.1.0, Mar. 2015, 1-15.
(Continued)

*Primary Examiner* — Samina F Choudhry
(74) *Attorney, Agent, or Firm* — Murphy, Bilak & Homiller, PLLC

(57) ABSTRACT

There is disclosed a method in a first network node (120A) operating in a split bearer environment, the first network node (120A) being communicatively connected with a second network node (120B) via an internode interface (135A, 135B). The method comprises obtaining, by the first network node (120A), expected queuing times of packet data convergence protocol, PDCP, packet data units, PDUs at the first network node (120A) and at the second network node (120B). The method comprises determining, by the first network node (120A) and according to the estimated
(Continued)

expected queuing times, forwarding of a flow of PDCP PDUs destined for a User Equipment, UE, (100).

20 Claims, 9 Drawing Sheets

(51) Int. Cl.
*H04W 28/12* (2009.01)
*H04W 28/14* (2009.01)

(56) References Cited

U.S. PATENT DOCUMENTS

| | | | |
|---|---|---|---|
| 2010/0042726 A1* | 2/2010 | Luzon | G06Q 10/06 709/226 |
| 2015/0085667 A1* | 3/2015 | Sivanesan | H04W 76/38 370/237 |
| 2017/0244520 A1* | 8/2017 | Koskinen | H04L 1/1848 |

OTHER PUBLICATIONS

Unknown, Author, "Flow control in LTE-WLAN Aggregation", 3GPP TSG-RAN WG2 #91 bis, Tdoc R2-154765, Malmo, Sweden, Oct. 5-9, 2015, 1-5.
Unknown, Author, "PDCP Re-ordering Delay Issue for Split Bearer", 3GPP TSG-RAN WG3 #88, R3-151144, Fukuoka, Japan, May 25-29, 2015, 1-2.
Unknown, Author, "PDCP split bearer reordering algorithm", 3GPP TSG-RAN WG2 #87bis, Tdoc R2-144372, Shanghai, P.R. China, Oct. 6-10, 2014, 1-5.
Unknown, Author, "Xw Flow Control", 3GPP TSG-RAN WG3 #89, R3-151641, Beijing, China, Aug. 24-28, 2015, 1-4.

* cited by examiner

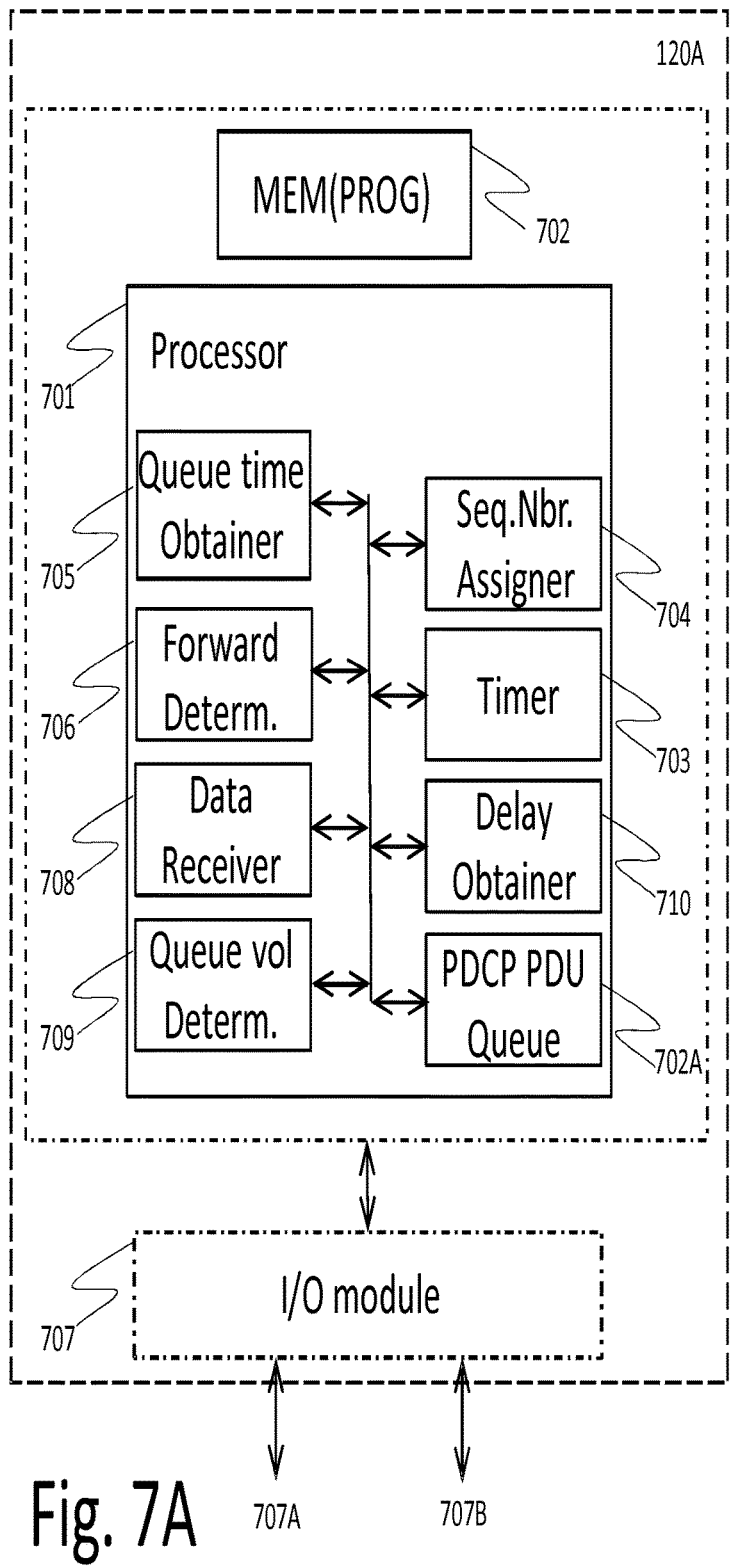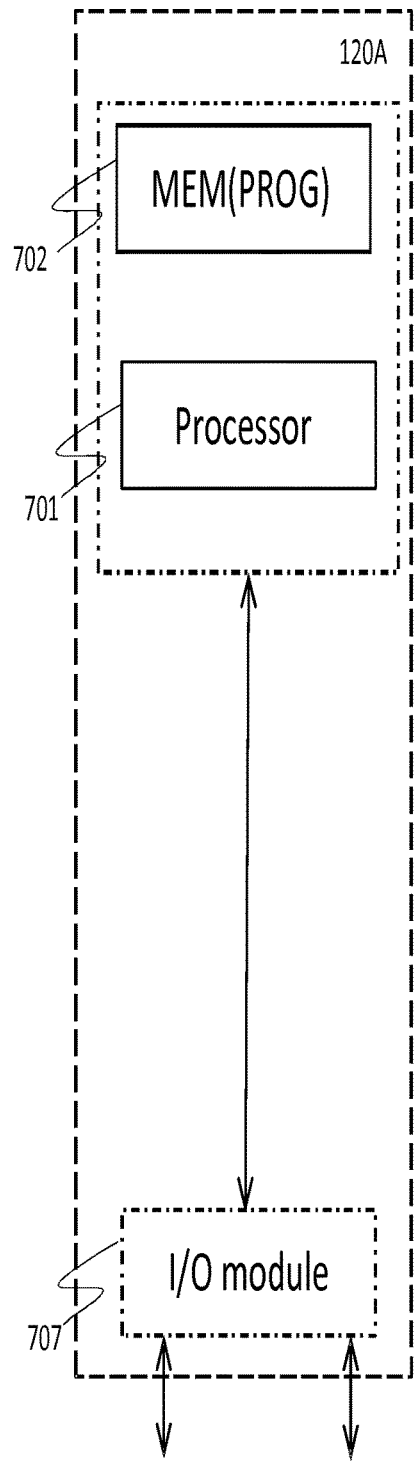
Fig. 7A
Fig. 7B

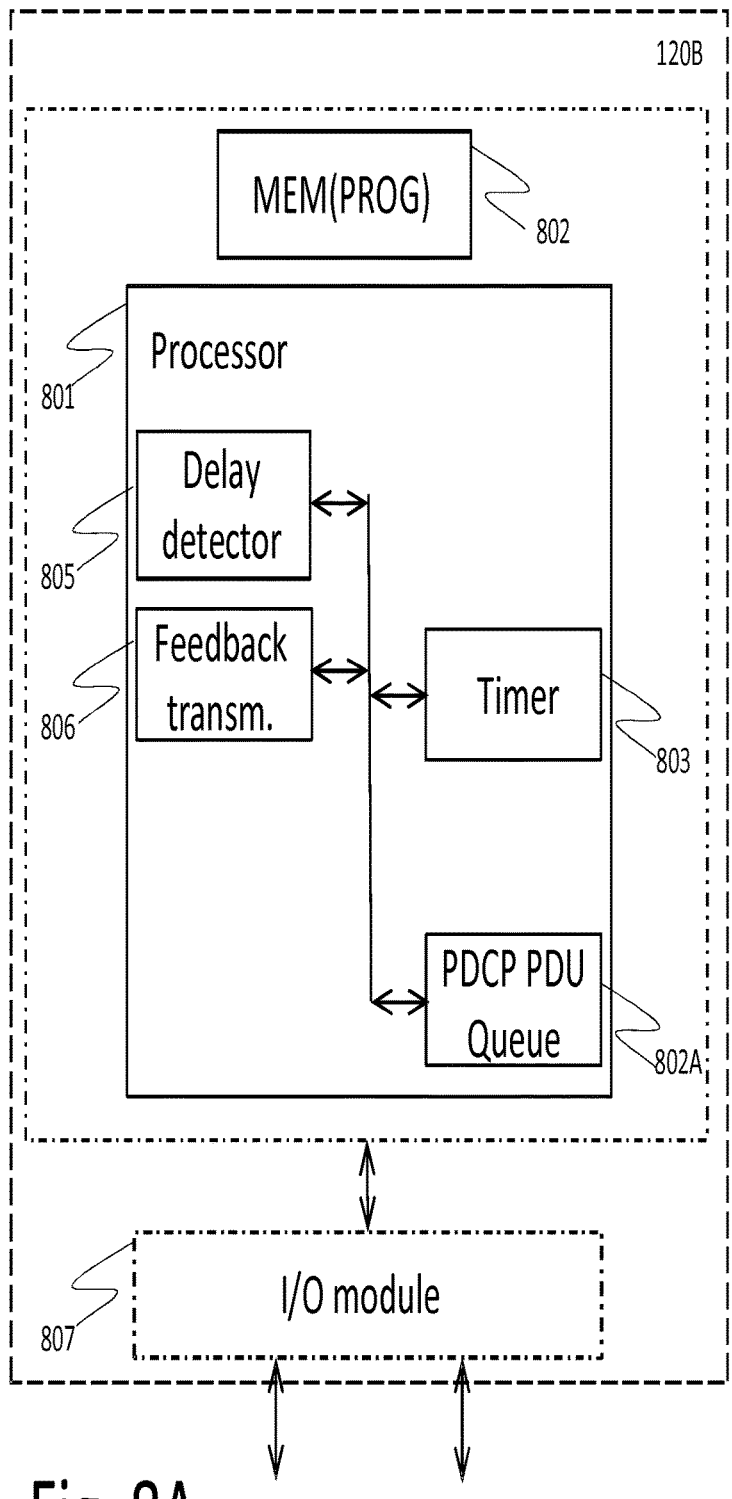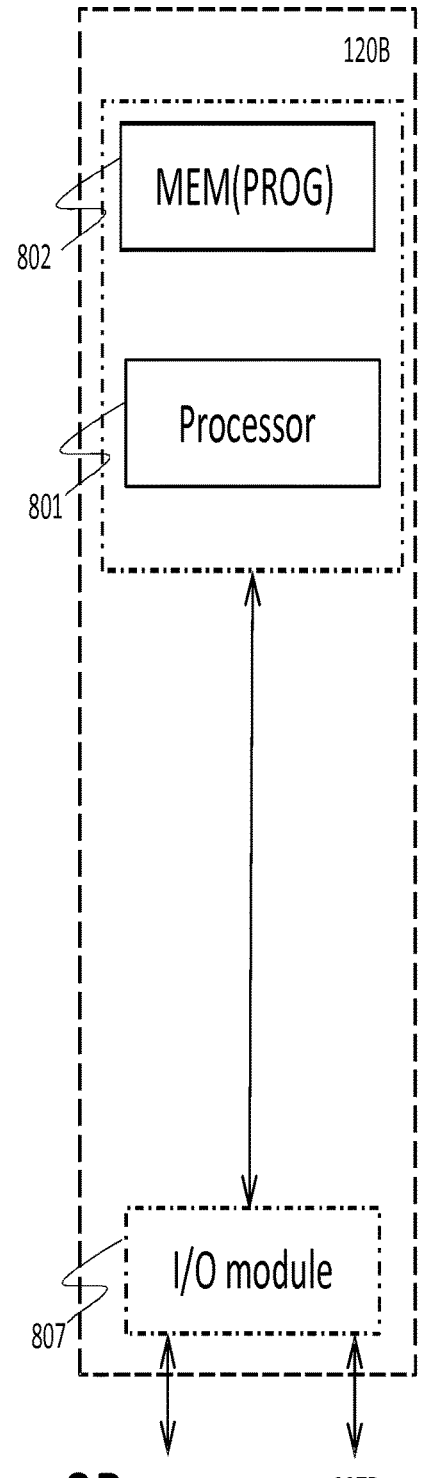
Fig. 8A
Fig. 8B

METHOD, SYSTEM AND DEVICE FOR PROVIDING FLOW CONTROL IN A SPLIT BEARER ENVIRONMENT

TECHNICAL FIELD

The present idea relates generally to a method, system and device to enable a Radio Base Station to perform an enhanced flow control of Packet Data Units in cooperation with one or more other Radio Base Stations or Access Points.

BACKGROUND

In a typical cellular network, also referred to as a wireless communication system, a User Equipment (UE), communicates via a Radio Access Network (RAN) to one or more Core Networks (CNs).

A UE is referred to as a mobile terminal by which a subscriber can access services offered by an operator's CN. The UEs may be for example communication devices such as mobile telephones, cellular telephones, laptops, tablet computers or vehicle-mounted mobile devices, enabled to communicate voice and/or data. The wireless capability enables to communicate voice and/or data, via the RAN, with another entity, such as another UE or a server.

The cellular network covers a geographical area which is divided into cell based areas. Each cell area is served by a Base Station (BS), or Radio Base Station (RBS), which is also referred to as e.g. "evolved NodeB", "eNB", "eNodeB", "NodeB", "B node", BTS (Base Transceiver Station) or Access Point (AP), depending on the technology and terminology used, such as Long Term Evolution (LTE), or Wireless Local Area Networks (WLAN), deploying WiFi IEEE 802.11 protocols. Aggregation of more than one carrier on the same or separate bands is an option, in addition to the bands already in use for LTE.

The RBSs may be of different classes such as e.g. macro RBS, home RBS or pico RBS, or short distance APs, based on transmission power and thereby also on cell size.

A cell is the geographical area where radio coverage is provided by the RBS at a RBS site or AP. One RBS or AP may serve one or more cells, also denoted as carriers. Further, each RBS or AP may support one or several communication technologies. The RBSs or AP communicate over the air interface operating on radio frequencies with the UEs within coverage range of the RBSs or APs.

The Universal Mobile Telecommunication System (UMTS) is a third-generation, 3G, mobile communication system, which evolved from the second-generation, 2G, Global System for Mobile communications (GSM), and is intended to provide improved mobile communication services based on Wideband Code Division Multiple Access (W-CDMA) access technology. UMTS Terrestrial Radio Access Network (UTRAN) is essentially a RAN using W-CDMA. The 3rd. Generation Partnership Project (3GPP) has undertaken to evolve further the UTRAN (and GSM) based radio access network technologies.

The Long Term Evolution (LTE) (-advanced) mobile communication system is defined as the fourth-generation (4G) mobile communication technology standard within 3GPP as to improve UMTS to cope with future requirements in terms of improved services such as higher data rates, improved efficiency, and lower costs. The UTRAN, being the radio access network of UMTS is further developed into an Evolved UTRAN (E-UTRAN), also referred to as a mobile broadband network, and indicated as the radio access network of an LTE (advanced) system. In an E-UTRAN, a UE is wirelessly connected to a RBS, commonly referred to as evolved NodeB, eNodeB or eNB.

Dual connectivity is one of the features that had been standardized within the umbrella work of small cell enhancements within 3GPP Release-12. Dual connectivity is a feature that allows a UE to simultaneously receive and transmit to at least two different RBSs or APs. If dual connectivity is deployed in an LTE network technology, the two different RBSs are usually denoted as Master eNodeB (MeNB) and Secondary eNodeB (SeNB). MeNBs serve a Master Cell Group (MCG), and the SeNBs serves a Secondary Cell Group (SCG). It is assumed that the Radio Resource Control (RRC) protocol, which is responsible for configuring the UE, is terminated within the MeNB. While the UE receives RRC control signaling via the MCG, it may receive user data via both the MCG and the SCG.

In the split bearer architecture option of dual connectivity the downlink data is split on the Packet Data Convergence Protocol (PDCP) layer in the MeNB. The MeNB may route PDCP Packet Data Units (PDUs) dynamically via MeNB Radio Link Control (RLC) to the UE directly, or via an internode interface, also known as backhaul channel, to the SeNB and SeNB to the UE.

The data flow from MeNB to SeNB via the internode interface is typically controlled by a flow control protocol, in order to balance the SeNB buffer fill state. For this purpose flow control feedback had been defined in 3GPP TS 36.425.

FIG. 1 illustrates a block diagram wherein the relations between MeNB, SeNB and Internode Interface are depicted. FIG. 1 shows one or more wireless device(s) 100 (which may be interchangeably referred to as UEs 100), radio network node(s) 120A, 120B (which may be interchangeably referred to as eNBs), and core network node(s) 150. A UE 100 may communicate with eNB 120A, 120B over a wireless interface For example, UE 100 may transmit wireless signals to one or more of eNBs 120A and 120B, and/or receive wireless signals from one or more of radio network nodes 120A and 120B. The wireless signals may contain voice traffic, data traffic, control signals, and/or any other suitable information UE 100 may have dual connectivity capability. Thus, UE 100 may be able to receive signals from and/or transmit signals to at least two different eNBs 120A, 120B simultaneously, via wireless links 110A, 110B respectively. eNB 120A, 120B may interface with core network node 150 via links 130A, 130B respectively, interconnecting network 140, and link 145. The interconnecting network 140 may refer to any interconnecting system capable of transmitting audio, video, signals, data, messages, or any combination of the preceding. eNBs 120A and 120B may communicate to each other by means of an internode interface 135A which may be implemented as an LTE X2 interface. eNBs 120A, 120B interface with one or more Radio Base Stations (RBSs), such as eNBs 120A and 120B over the interconnecting network 140 via links 130A, 130B. The signaling connection link between MeNB 120A and SeNB 120B, comprising links 130A, 130B and interconnecting network 140 may comprise LTE X2 or LTE S1 interfaces, and is collectively denoted as internode interface 135B in the remainder of this application.

Core network node 150 may manage the establishment of communication sessions and various other functionalities for UE 100. Wireless device 110 may exchange certain signals with core network node 150 using the non-access stratum layer. In non-access stratum signaling, signals between UE 100 and core network node 150 may be transparently passed through the radio access network.

FIG. 2 illustrates a block diagram of stack layers of LTE entities wherein PHY denotes the Physical layer, MAC denotes the Media Access Control Layer, RLC denotes the Radio Link Control layer and PDCP denotes the PDCP layer.

FIG. 2 depicts an operation wherein, MeNB 120A receives user data 204 for UE 100. In other words, MeNB 120A may receive one or more PDCP PDUs to send to UE 100. MeNB 120A may transmit one or more PDCP PDUs to UE 100 via link 110A, and may forward 208 one or more PDCP PDUs to SeNB 120B so that SeNB 120B can transmit these PDCP PDUs to UE 110 via link 110B. The PDCP PDUs forwarded 208 to SeNB 120B may have both PDCP sequence numbers (SNs) and internode interface specific SNs. The internode interface specific SNs may be consecutive, and the PDCP SNs may not be consecutive from the perspective of SeNB 120B. SeNB 120B may report feedback 206 to MeNB 120A. The PDCP PDU received from MeNB 120A and SeNB 120B by the UE 100, are submitted 202 to the UE's processing system. The forwarded PDCP PDUs 208 and the reported feedback 206, both traverse the internode interface 135A, 135B. The SeNB 120B is depicted without a PDCP layer as it has no function for the explanation of the method proposed, although the SeNB is an eNB which applies a PDCP layer for its own communication to a network core node, such as core node 150.

MeNB 120A may perform one or more operations based on the received feedback 206. As described above, flow control feedback 206 between MeNB 120A and SeNB 120B may be required for the split bearer operation in dual connectivity to balance the dataflow between MeNB 120A and SeNB 120B.

Feedback from SeNB 120B to MeNB 120A for a split bearer environment may comprise a highest successfully delivered PDCP PDU sequence number by the SeNB 120B RLC; a list of unsuccessfully delivered PDUs on internode interface 135A, 135B based on internode interface specific sequence numbers (e.g., as a list of sequence numbers); and a desired amount of additional bytes by SeNB 120B as an offset of bytes to the highest successfully delivered PDCP PDU sequence number.

Based on this feedback, and by taking into account feedback of successfully delivered PDCP PDUs from MeNB 120A RLC, MeNB 120A may perform flow control measures as to maximize the throughput via SeNB 115B, taking into consideration its desired amount of data.

SUMMARY

In view of the discussion above, it is an object for embodiments herein to provide an enhanced flow control of Packet Data Convergence Protocol Packet Data Units, PDCP PDUs, in a split bearer environment. It is another object that the improved flow control has a flexibility to be dynamically adaptable to changing link conditions.

The present idea is described within the context of Long Term Evolution (LTE), i.e. Evolved Universal Mobile Telecommunication System (UMTS) Terrestrial Radio Access Network (E-UTRAN). It should be understood that the problems and solutions described herein are equally applicable to wireless access networks and User Equipment (UE) implementing other access technologies and standards. LTE is used as an example technology where the idea is suitable, and using LTE in the description therefore is particularly useful for understanding the problem and solutions solving the problem.

As described above, dual connectivity is a feature that allows a UE to simultaneously receive and transmit to at least two different network points, commonly referred to as Master e-NodeB (MeNB) and Secondary e-NodeB (SeNB). Feedback between the MeNB and the SeNB may be required for the split bearer operation in dual connectivity to balance the dataflow between MeNB and SeNB.

The present disclosure therefore contemplates enhanced embodiments that may provide efficient determination of queuing times at the MeNB and at the SeNB, and optionally, of any delays caused by the internode interface 135A, 135B between the MeNB (as represented by the first network node 120A) and the SeNB (as represented by the second network node 120B) that enables these requirements to be fulfilled. Although explained for an implementation with one MeNB and a single SeNB, the solution is applicable for a configuration with multiple SeNBs.

In an aspect of the idea a method in a first network node is proposed, the first network node operating in a split bearer environment, the first network node being communicatively connected with a second network node via an internode interface. The method comprises the steps of:
Obtaining, by the first network node 120A, expected queuing times of packet data convergence protocol (PDCP) packet data units (PDUs) at the first network node 120A and at the second network node 120B; and
Determining, by the first network node (120A) and according to the estimated expected queuing times, a forwarding of a flow of PDCP PDUs destined for a User Equipment (UE) 100.

The method comprises the step of
Obtaining, by the first network node, a delay of the internode interface, and wherein the delay is used for adjusting buffer queuing time of the flow of PDCP PDUs destined for the UE at the first network node and/or at the second network node.

The flow of PDCP PDUs destined for the UE can be forwarded on the internode interface to the second network node at time t only if the expected queueing time at the first network node at time t is larger than a sum of $T_{DL}$ and the expected queueing time at the second network node at time $t+T_{DL}$. Where $T_{DL}$ is downlink delay of the internode interface in seconds.

The expected queuing times can be used for determining the forwarding of the flow of PDCP PDUs destined for the UE on the internode interface to the second network node.

The expected queuing times can be used for determining the forwarding of the flow of PDCP PDUs destined for the UE on a wireless link from the first network node to the UE.

The expected queuing time can represent packet delay in relation to packet transmission at at least one of the first network node and at the second network node.

The packet delay can be related to delay of the internode interface for packet transmission from the first network node to the second network node.

The forwarding of the flow of PDCP PDUs destined for the UE can further be determined according to delay of the internode interface for packet transmission from the first network node to the second network node.

The expected queuing times can be estimated by the first network node.

The delay of the internode interface can be obtained at the first network node.

The internode interface delay for packet transmission from the second network node to the first network node can be determined at the first network node.

The first network node can request the second network node to submit the delay for packet transmission from the first network node to the second network node to the first network node.

The delay for packet transmission from the first network node to the second network node can be based on timestamps associated with a PDCP PDU forwarded by the first network node on the internode interface, at least one of the timestamps set by the first network node.

The delay for packet transmission from the second network node to the first network node can be based on timestamps associated with a feedback report transmitted by the second network node on the internode interface, at least one of the timestamps set by the second network node.

A fluid approximation can be made to estimate buffer queuing states at the second network node.

The fluid approximation can relate to an incoming data rate of PDCP PDUs destined for the UE at the second network node and outgoing service rate at the second network node.

The method can further comprise a step of:
receiving, by the first network node from the second network node), current queue data volume at the second network node and current outgoing service rate at the second network node, and wherein the delay is based on the current queue data volume and the current outgoing service rate.

The method further comprises a step of:
determining, by the first network node, an expected queue data volume $q_{S,M}^Q(t+T_{DL})$ at the second network node based on a delay adjusted received current queue data volume at the second network node, outgoing data rate at the first network node towards the second network node, and delay adjusted outgoing service rate at the second network node towards the UE.

The queue data volume at time $t+T_{DL}$ at the second network node, where $T_{DL}$ is the delay of the internode interface in seconds, can be determined as a sum of received current queue data volume at the second network node, data volume forwarded to the internode interface for transmission to the second network node during a time related to the delay, and queue data volume transmitted via the second network node to the UE during a time related to the delay.

The first network node can be a Master e-NodeB, MeNB, the second network node can be a Secondary e-NodeB, SeNB, or wireless access point, wherein the MeNB and the SeNB can operate in a Long Term Evolution, LTE, or LTE advanced technology and the wireless access point can operate in a Wireless Local Area Network, WLAN.

In a further aspect the idea proposes a first network node configured for operation in a split bearer environment, the first network node being configured for a communicative connected with a second network node via an internode interface. The first network node comprising processing circuitry causing the first network node to:
Obtain expected queuing times of packet data convergence protocol (PDCP) packet data units (PDUs) at the first network node and at the second network node, and
Determine, according to the estimated expected queuing times, a forwarding of a flow of PDCP PDUs destined for a User Equipment (UE).

In yet a further aspect the idea proposes a first network node configured for operation in a split bearer environment, the first network node being configured for a communicative connected with a second network node via an internode interface. The first network node comprises:

An obtain module configured to obtain expected queuing times of packet data convergence protocol (PDCP) packet data units (PDUs) at the first network node and at the second network node, and A determine module configured to determine, according to the estimated expected queuing times, a forwarding of a flow of PDCP PDUs destined for a User Equipment (UE).

In yet a further aspect the idea proposes a mobile communication system comprising:
a first network node as disclosed above,
a second network node configured for operation in the split bearer environment, the second network node being configured for the communicative connected with the first network node via the internode interface, and
a User Equipment, UE, configured to receive PDCP PDUs from the first network node and the second network node as determined by the first network node according to the expected queuing times.

In the system the first network node can be a Master e-NodeB, MeNB, the second network node can be a Secondary e-NodeB, SeNB, or wireless access point, wherein the MeNB and the SeNB can operate in a Long Term Evolution, LTE, or LTE advanced technology and the wireless access point can operate in a Wireless Local Area Network, WLAN.

In yet a further aspect the idea proposes a computer program for a first network node configured for operation in a split bearer environment, the first network node being configured for a communicative connected with a second network node via an internode interface. The computer program comprises computer code which, when run on processing circuitry of the first network node, causes the first network node to:
Obtain expected queuing times of packet data convergence protocol (PDCP) packet data units (PDUs) at the first network node and at the second network node, and
Determine, according to the estimated expected queuing times, a forwarding of a flow of PDCP PDUs destined for a User Equipment (UE).

The objective is to determine the forwarding the flow of PDCP PDUs destined for the UE accurately, so that splitting of the queueing buffer in the MeNB is done in a way that PDUs are sent. Due to delays in the internode interface or SeNB queue, this objective could be challenging when 3GPP TS 36.425 is applied as such. The fed back delays are applied in determining the queue in the MeNB in a portion that represents the amount of PDCP PDUs that would not be submitted and acknowledged in time if these PDUs were forwarded to the SeNB.

By partitioning the MeNB queue in parts that are, and are not allowed to be forwarded to the SeNB, the objective is achieved.

These and other embodiments according to the present idea are now illustrated in more detail with reference to the enclosed drawings.

BRIEF DESCRIPTION OF THE DRAWINGS

FIG. 7A is a block diagram illustrating an embodiment of an entity;

FIG. 7B is a block diagram illustrating an embodiment of an entity;

FIG. 8A is a block diagram illustrating an embodiment of an entity;

FIG. 8B is a block diagram illustrating an embodiment of an entity; and

DETAILED DESCRIPTION

Figure 1:
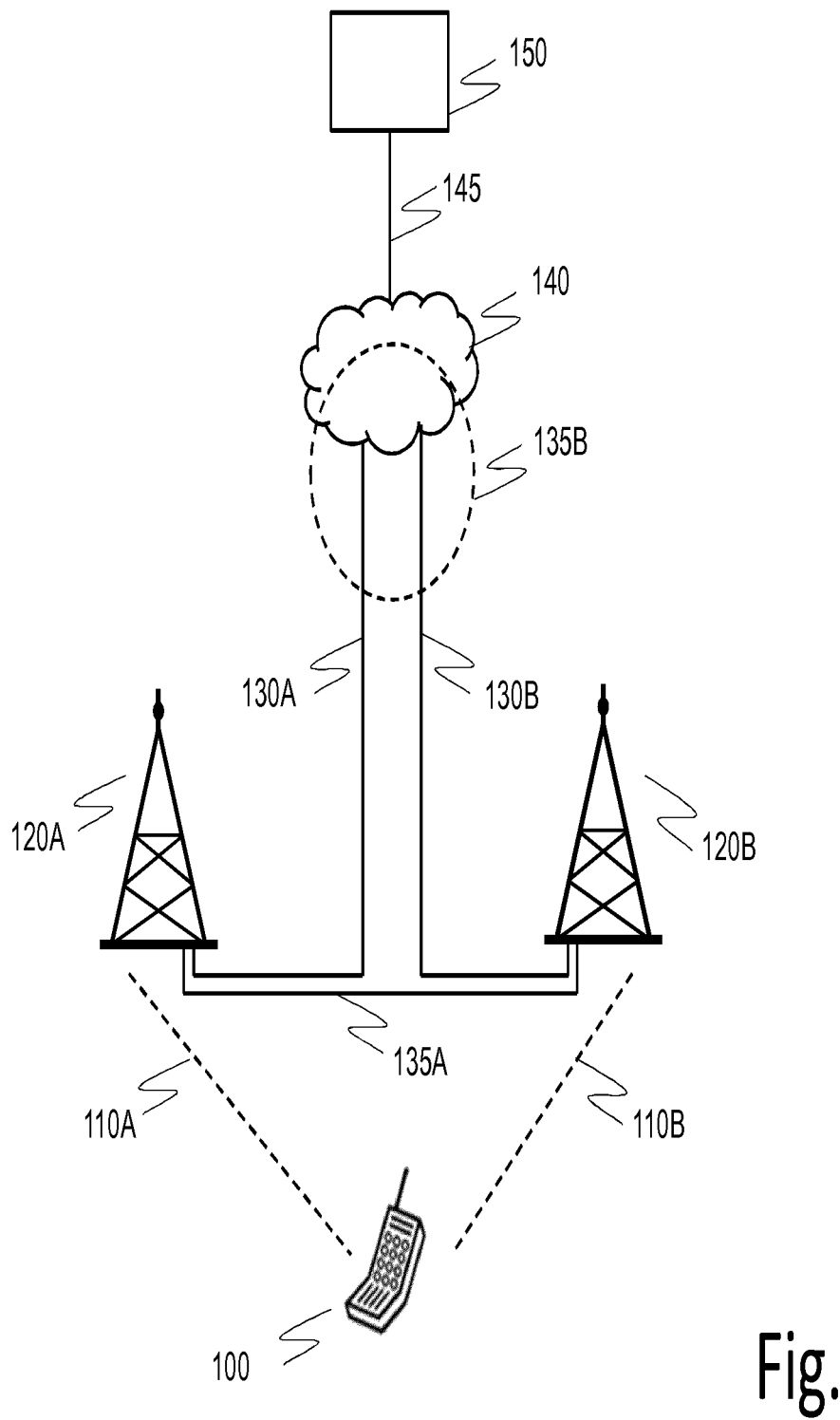
FIG. 1 is a block diagram illustrating an embodiment of a system.
Figure 2:
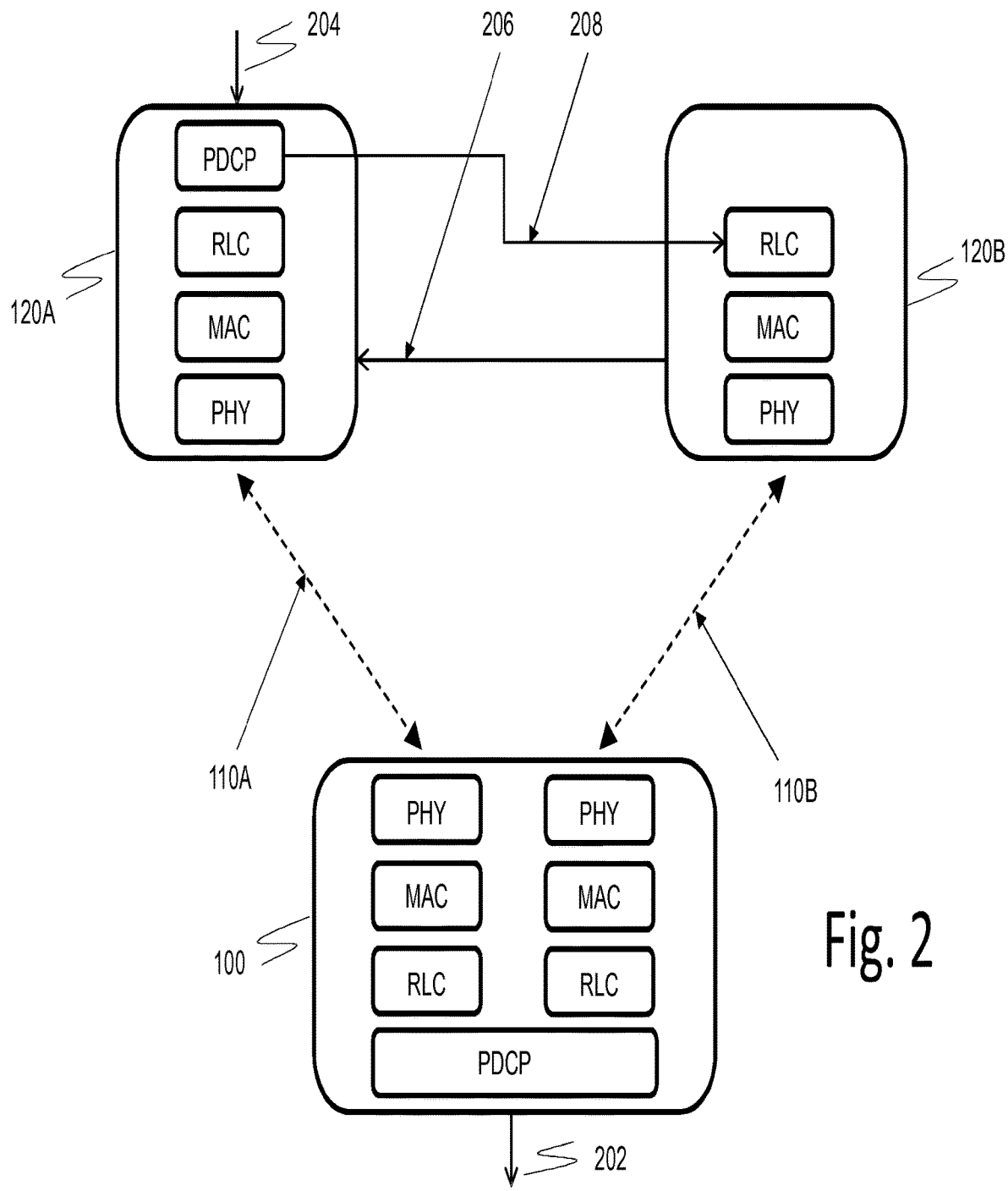
FIG. 2 is a block diagram illustrating an embodiment of a system.

With reference to FIGS. 1 and 2, a method of providing flow control is described that is performed in a first network node 120A. The first network node 120A operates in a split bearer environment. The first network node 120A is communicatively connected with a second network node 120B via an internode interface 135A, 135B. The internode interface 135A, 135B may thus define a backhaul interface between the first network node 120A and the second network node 120B. The first network node 120A will hereinafter be denoted by MeNB 120A and the second network node 120B will hereinafter be denoted by SeNB 120B. The method comprises obtaining, by the MeNB 120A, expected queuing times of packet data convergence protocol (PDCP) packet data units (PDUs) at the MeNB 120A and at the SeNB 120B. The method comprises determining, by the MeNB 120A and according to the estimated expected queuing times, forwarding of a flow of PDCP PDUs destined for a User Equipment (UE) 100.

The method comprises a step of obtaining, by the MeNB 120A, a delay of the internode interface 135A, 135B. The delay can be used for adjusting buffer queuing time of the flow of PDCP PDUs destined for the UE 100 at the MeNB 120A and/or at the SeNB 120B. The internode interface delay can thus be used by the MeNB 120A to adjust the reported buffer queuing time; then a new queue state at the SeNB 120B can be determined. The internode interface delay can be used by the MeNB 120A to estimate the queuing time and then take the forwarding decision. The expected queuing time can represent packet delay in relation to packet transmission at at least one of the MeNB 120A and at the SeNB 120B. The delay of the internode interface 135A, 135B can be used by the MeNB 120A for compensating the reported queue state. The delay of the internode interface 135A, 135B can be used by the MeNB 120A for estimating the expected queuing times. The delay of the internode interface 135A, 135B can be used by the MeNB 120A for changing the queuing times.

The packet delay can be related to delay of the internode interface 135A, 135B for packet transmission from the MeNB 120A to the SeNB 120B. The forwarding of the flow of PDCP PDUs destined for the UE 100 can further be determined according to delay of the internode interface 135A, 135B for packet transmission from the MeNB 120A to the SeNB 120B (so-called downlink delay). The expected queuing times can be estimated by the MeNB 120A. The delay of the internode interface 135A, 135B can be obtained at the MeNB 120A. The internode interface delay for packet transmission from the SeNB 120B to the MeNB 120A (so-called uplink delay) can be determined at the MeNB 120A. The MeNB 120A can request the SeNB 120B to submit the delay for packet transmission from the MeNB 120A to the SeNB 120B (i.e., the downlink delay) to the MeNB 120A. The delay for packet transmission from the MeNB 120A to the SeNB 120B (i.e., the downlink delay) can be based on timestamps associated with a PDCP PDU forwarded by the MeNB 120A on the internode interface 135A, 135B, at least one of the timestamps set by the MeNB 120A. The delay for packet transmission from the SeNB 120B to the MeNB 120A (i.e., the uplink delay) can be based on timestamps associated with a feedback report transmitted by the SeNB 120B on the internode interface 135B, 135A, at least one of the timestamps set by the SeNB 120B.

As will be further disclosed below, a fluid approximation can be made to estimate buffer queuing states at the SeNB. The fluid approximation can relate to an incoming data rate of PDCP PDUs destined for the UE at the SeNB and outgoing service rate at the SeNB.

The method that is described here, besides the specified 3GPP TS 36.425 flow control feedback of highest successfully in-sequence delivered PDCP PDU, desired additional number of bytes, and missing X2 PDUs on the internode interface 135A, 135B, explains how an additional flow control feedback information is sent from SeNB 120B to MeNB 120A. This additional information may include The latest delay estimate or measurement of the one-way latency on the internode interface 135A, 135B from MeNB 120A to SeNB 120B. The measurement can be obtained e.g. by calculating the difference between sent-time and receive-time of downlink data. For this purpose the MeNB may include sent-time timestamps when transmitting downlink data on the internode interface 135A, 135B to the SeNB 120B, but also other methods are conceivable to give an acceptable estimate of the current internode interface 135A, 135B delay, e.g. sending probing message on lower layers of the internode interface 135A, 135B. It must be assured that these delay measures, only measure the delay from MeNB 120A to SeNB 120B and not the round trip delay, while the other delay estimation measures typically measure the round trip delay.

The current SeNB 120B queuing time in the SeNB 120b queue, which is the time the oldest data unit spent in the SeNB 120B queue. For this measure, the delay or time spent of a PDCP PDU in the queue associated with a PDCP PDU destined for the specific UE using the SeNB for aggregation purposes, or alternatively the overall packet data queue of all UEs associated with the SeNB could be considered. Alternatively, the SeNB may estimate the expected queueing time for new packets in the SeNB based on metrics defined further below.

Alternatively the sum of the one-way delay estimate of the internode interface 135A, 135B and SeNB 120B queuing time as described previously may be indicated from SeNB 120B to MeNB 120A.

Feedback may be provided periodically, i.e. based on feedback periodicities used also for other feedback indications, such as highest successfully delivered PDCP PDU, desired bytes, missing X2 PDUs as described above, but also lower periodicities may be used, such as 10 ms or 20 ms.

In one embodiment of the flow control method, feedback is only given upon request. I.e. the SeNB 120B includes this information in flow control feedback only upon explicit request from MeNB 120A. This request could be triggered by inserting the before mentioned sent-timestamp in the downlink data transmission from MeNB 120A to SeNB 120B. If this timestamp is present, the SeNB 120B is requested to include the additional flow control feedback, i.e. internode interface 135A 135B delay measurement, SeNB 120B queuing time or sum of both.

The feedback request might also be seen as a probing of the delay on the internode interface 135A, 135B (and, optionally, on SeNB 135B queue). The feedback request can also be indicated explicitly in a new control frame from MeNB 120A to SeNB 120B, alternatively to including it in an existing transport frame from MeNB 120A to SeNB 120B. An existing transport frame could also be empty, e.g. does not need to include user data, when the feedback request is included.

Figure 3:
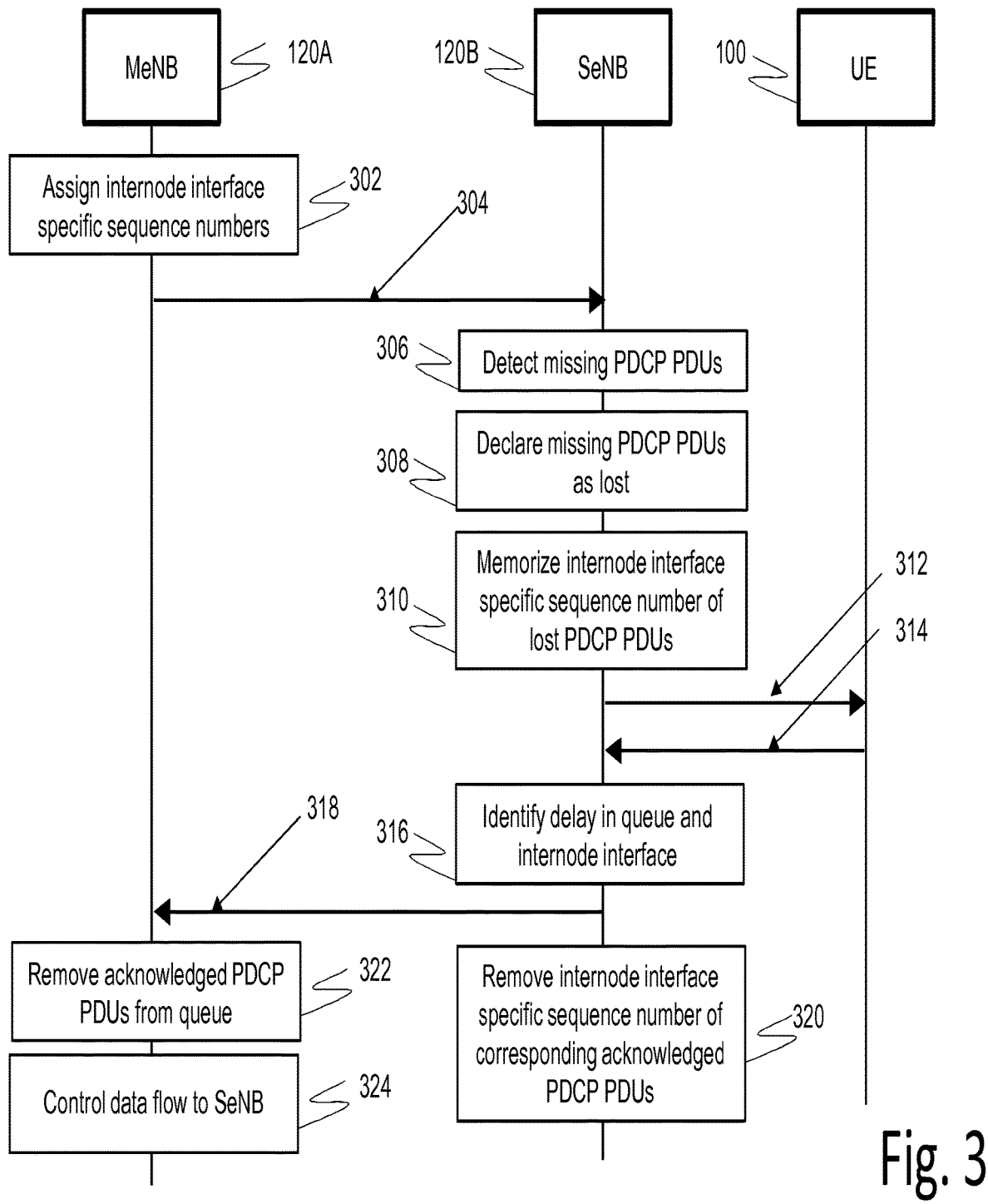
FIG. 3 is a signalling diagram illustrating an embodiment of a method.

FIG. 3 is a signalling diagram illustrating an embodiment of method steps wherein the feedback is collected by the SeNB 120B and fed back to the MeNB 120A.

MeNB 120A assigns 302 internode interface sequence numbers to each PDCP PDU that is to be forwarded to the SeNB 120B and subsequently forwards 304 the PDCP PDU to the SeNB via the internode interface 135A, 135B.

The SeNB receives 304 the PDCP PDU and is able, according to the method described in 3GPP TS 36.425 to detect 306 whether one or more PDCP PDUs are missing, and if so declares 308 these PDCP PDUs as lost and memorizes 310 the internode interface specific sequence number of these lost PDCP PDUs. The PDCP PDUs regarded as lost were apparently lost while traversing the internode interface 135A, 135B.

The SeNB 120B, still having PDCP PDUs received, albeit maybe not all PDCP PDUs forwarded by the MeNB 120A, queues and schedules the PDCP PDUs for transmission to the UE. Subsequently the transmitter of SeNB transmits 312 the PDCP PDUs to UE 100 via wireless link 110B.

The UE 100, when having successfully received the PDCP PDUs will acknowledge 314 the reception of the particular PDCP PDU towards the SeNB 120B. The period of time that the PDCP PDUs were in the queue of SeNB 120B, regarded as a queue delay. The SeNB 120B delay comprises the queue delay and processing delay and can be estimated based on among others the packet's position in the queue, the outbound throughput, the priority of the bearer the packet is associated with, the scheduling type of the SeNB 120A, e.g. Round-Robin, Proportional Fair scheduling, or Hybrid automatic repeat request (HARQ) error probability, HARQ Round Trip Time, RTT, RLC retransmission delay, processing time at the SeNB 120A and UE 100.

The queue delay is identified 316 by SeNB 120B. The SeNB 120B may also identify 316 an internode interface delay caused by the transfer over the internode interface 135A, 135B by e.g. detecting a timestamp in an internode interface specific frame, and comparing this timestamp with a local synchronized timer of the SeNB 120B. In an embodiment, the internode specific frame is a specific frame that comprises the forwarded PDCP PDUs.

The SeNB transmits 318 a feedback to the MeNB, comprising any or any combination of:
the estimated queuing time identified;
the estimated internode interface delay identified;
the highest PDCP sequence number of a PDCP PDU that was successfully delivered in sequence to the UE 100, as acknowledged by the UE 100, among the one or more PDCP PDUs received by the SeNB from the MeNB;
a desired additional amount of data in bytes, the desired additional amount of data in bytes counted from the highest PDCP sequence number of the PDCP PDU that was successfully delivered in sequence to the user equipment;
a list of any internode interface specific sequence numbers of PDCP PDUs sent to the SeNB 120B that were declared as being lost at the SeNB 120B and not yet reported to the MeNB 120A as being lost;
the currently minimum desired buffer size at the SeNB for transmitting to the UE user data associated with Radio Access Bearers configured with the split bearer option.

On reception 318 of the feedback, the MeNB 120A removes 322 the acknowledged PDCP PDUs from its queue. The MeNB may, based on among others, the feedback received 318, its own queuing time, its own processing status, priority bearers, etc. control 324 the dataflow of PDCP PDUs by means of a flow control scheme wherein a part of the PDCP PDU are transmitted by the MeNB 120A to the UE 100 and another part, also destined for the same UE 100, will be forwarded to the SeNB 120B. Particularly, the delay of the internode interface 135A, 135B can be used for adjusting buffer queuing time of the flow of PDCP PDUs destined for the UE 100 at the MeNB 120A and/or at the SeNB 120B. The expected queuing times (and optionally, the delay of the internode interface 135A, 135B) can further be used for determining forwarding of the flow of PDCP PDUs destined for the UE 100 on the internode interface 135A, 135B to the SeNB 120B. The expected queuing times (and optionally, the delay of the internode interface 135A, 135B) can further be used for determining forwarding of the flow of PDCP PDUs destined for the UE 100 on a wireless link 110A from the MeNB 120A to the UE 100.

Figure 4:
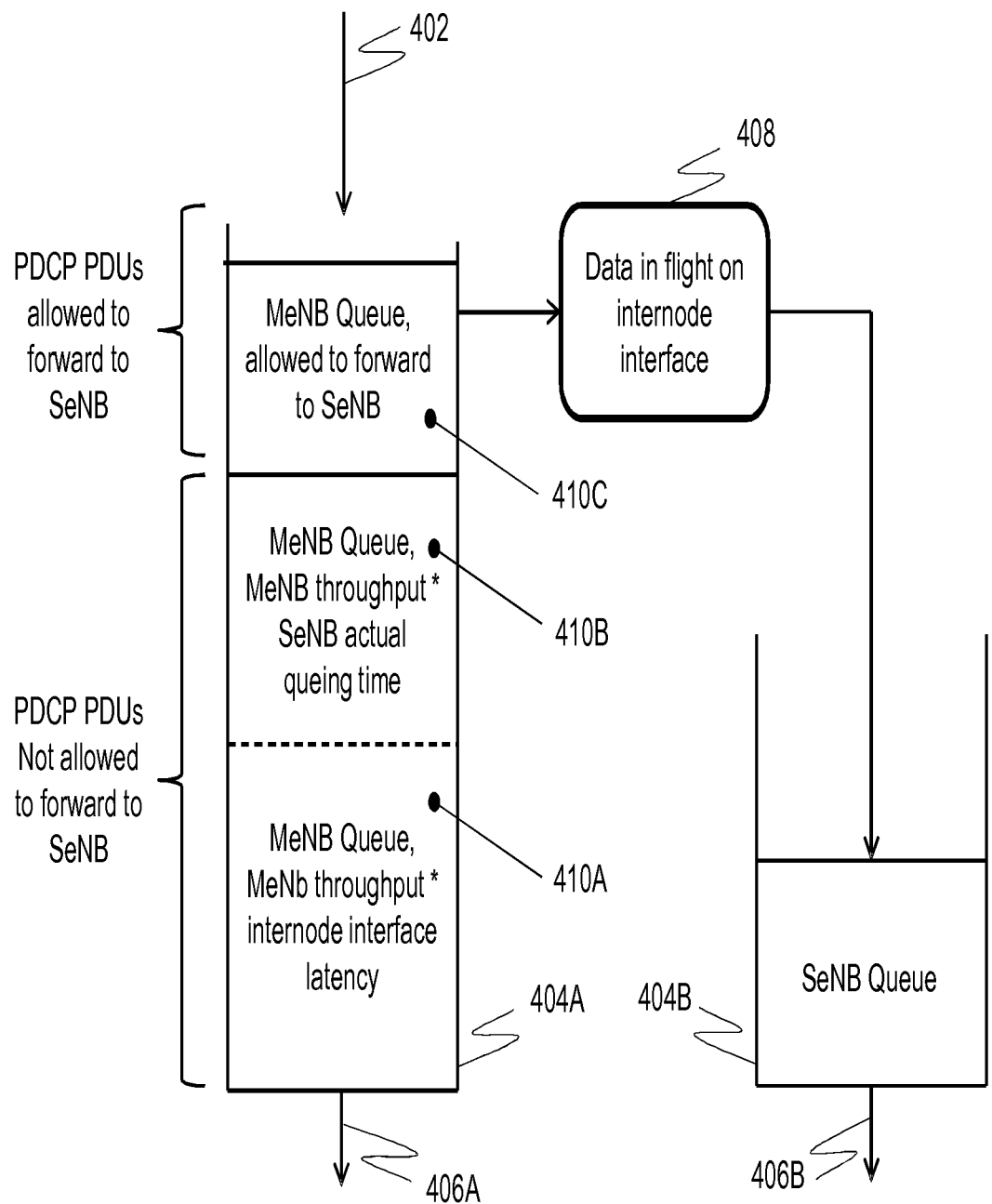
FIG. 4 is a block diagram illustrating an embodiment of a method.

FIG. 4 is a block diagram illustrating an embodiment of the method wherein the flow control of the MeNB 120A forwards PDCP PDUs to the SeNB. A general target of the MeNB 120A is to deliver data as fast as possible to the UE 100. In the case of a split bearer environment, also known as dual connectivity from the UE's 100 perspective, the target is to deliver PDCP PDUs as fast as possible to the UE, by either the MeNB 120A or the SeNB 120B. Such that this aim can be achieved by forwarding PDCP PDUs either via MeNB 120A directly to the UE 100 or via the internode interface 135A, 135B and SeNB 120B to the UE 100.

FIG. 4 depicts a queue 404A of the MeNB 120A and a queue 404B of the SeNB 120B. PDCP PDUs, destined for UE 100, are received 402 by the MeNB 120A in its queue 404A.

The flow controller of MeNB 120A decides which and how many PDCP PDUs from queue 404A, based on among others the feedback received from the SeNB 120B, are forwarded 408 to SeNB 120B. PDCP PDUs scheduled for transmission to the UE 100, are taken out 406A, 406B from both queues 404A, 404B respectively. Particularly, the flow of PDCP PDUs destined for the UE 100 can be forwarded on the internode interface 135A, 135B to the SeNB 120B at time t only if expected queueing time at the MeNB 120A at time t is larger than a sum of $T_{DL}$ and expected queueing time at the SeNB 120B at time t+$T_{DL}$, where $T_{DL}$ is the time of the internode interface 135A, 135B in seconds for packet transmission from the MeNB 120A to the SeNB 120B.

The MeNB 120A estimates based on its own outbound throughput and the received feedback from the SeNB 120B how much of the queued PDCP PDUs it can transmit faster to the UE 100 itself than forwarding it to the SeNB 120B and transmitting it from there to the UE 100.

In one embodiment, for each newly incoming 402 PDCP PDU, or at each the reception of each flow control feedback, or periodically, the MeNB 120A estimates the delay of the new packet, or of each of the packets in the queue 404A, to reach the UE 100 via its own link 110A, as well as the delay of the internode interface 135A, 135B and, the queuing time at the SeNB 120B). Based on these values, the MeNB 120A may decide via which link the PDCP PDU is send to the UE 100.

The queue 404A of MeNB 120A is for illustrative means divided into several parts, representing amounts of PDUs;
part 410A, comprising a number of PDUs representing: (MeNB 120A throughput*Internode interface 135A, 135B delay)
part 410B, comprising a number of PDUs representing: (MeNB 120A throughput*SeNB 120B queuing time)
part 410C, PDUs received 402, and not allocated to either part 410A or 410B.

As an example decision criterion, the MeNB 120A flow controller may for each newly received 402 PDCP PDU define via which link the PDCP PDU will be submitted to the UE 100, and hence in which queue part 410A, 410B, 410C the PDU will be part of according to the above disclosed criterion, namely to forward the PDCP PDUs to the SeNB 120B at time t only if expected queuing time at the MeNB 120A at time t is larger than a sum of $T_{DL}$ and expected queuing time at the SeNB 120B at time t+$T_{DL}$, where $T_{DL}$ is the delay of the internode interface 135A, 135B in seconds. The MeNB 120A flow controller may base its decision on the following:

If the MeNB 120A delay is larger or equal to the sum of a) the delay in relation to the internode interface 135A, 135B, and b) the delay in relation to the queue 404B of SeNB 120B, then forward PDCP PDUs to the SeNB 120B. FIG. 4 indicates the part of the queue 404A for these PDCP PDUs as "PDCP PDUs allowed to forward to SeNB" 410C.

If on the other hand the MeNB 120A delay is lower to the sum of a) the delay in relation to the internode interface 135A, 135B and b) the delay in relation to the queue 404B of SeNB 120B, then keep the packet in the queue 404A at the MeNB 120A, as indicated in FIG. 4 by "not allowed to forward to SeNB" 410A, 410B.

Wherein:
The MeNB 120A delay comprises the queuing time and processing delay. This MeNB 120A delay can be estimated based on among others the packet's position in the queue, the outbound throughput, the priority of the bearer the packet is associated with, the scheduling type of the MeNB 120A, e.g. Round-Robin, Proportional Fair scheduling, or Hybrid automatic repeat request (HARQ) error probability, HARQ Round Trip Time, RTT, RLC retransmission delay, processing time at the MeNB 120A and UE 100.
The delay in relation to the internode interface 135A, 135B is the based on the corresponding delay information received from as feedback 318 from the SeNB.
The delay in relation to the queue 404B of SeNB 120B is the based on the corresponding delay information received from as feedback 318 from the SeNB.

By means of allocating parts 410A, 410b and 410C of the queue 404A explained above the forwarding of PDCP PDUs, the flow control method shown in 3GPP TS 36.425 can take PDCP PDUs from the respective queue parts 410A, 410B, 410C.

The MeNB 120A may take PDCP PDUs, to be transmitted via MeNB 120A to the Ue 100, from the entire queue 404A, so from parts 410A, 410B and 410C, while PDCP PDUs to be forwarded to the SeNB 120B may only be taken from the part 410C.

If there are free transmission opportunities at the MeNB 120A, e.g. indicated by MeNB scheduler, PDCP PDUs are taken or pulled from the queue 404A in the MeNB 120A and transmitted to the UE 100.

At the subsequent delay estimation, based on the received feedback 318, by the MeNB 120A as described above, delay for the PDCP PDUs is re-evaluated. It may happen that at this point the delay in relation to the internode interface 135AQ, 135B, or the delay in relation to the queue 404B of the SeNB 120B is reduced, in which case packets previously determined as "Not allowed to forward to the SeNB" are forwarded to the SeNB.

The flow controller of MeNB has a first task in partitioning the queue 404A into parts 410A, 410B and 410C by means of allocating newly received 402 PDCP PDUs, and a second task of taking out PDCP PDUs for delivering by the MeNB 120A directly to the UE 100, of having the MeNB 120A forwarding the PDCP PDU towards the SeNB 120B.

When estimating the delays (of the internode interface 135A, 135B) of a new packet to be sent either via MeNB 120A or SeNB 120B at a time t, the estimate of the SeNB queuing time at the time when the new packet arrives at this buffer is estimated. Assuming a backhaul delay of $T_{DL}$, this is at t t+$T_{DL}$. Furthermore, feedback from the SeNB 120B, on which basis the forwarding/splitting decision is made, reflects the situation at the SeNB $T_{UL}$ time ago. Thus, according to embodiments disclosed herein the forwarding decision is delay-compensated. The forwarding decision can then be based on selecting the path (either via MeNB or SeNB 120B) with the lowest expected delay for each new packet to be sent (and for the packets already located at the MeNB 120A buffer) in order to send it to the UE 100.

On one hand, the expected MeNB queuing time $D_M$ for the desired packet to be transmitted is:

$$D_M(t) = \frac{q_M^Q(t)}{\mu_M(t)}$$

On the other hand, we have the expected SeNB queuing time $D_S$ for the desired packet to be transmitted. This delay is at the desired time t+$T_{DL}$, since it is when the desired packet would arrive at the SeNB Tx buffer:

$$D_S(t+T_{DL}) = \frac{q_S^Q(t+T_{DL})}{\mu_S(t+T_{DL})},$$

where
$q_M^Q(t)$: Current queue data volume (buffer size) at the M eNB
$q_S^Q(t+T_{DL})$: Queue data volume at the SeNB at the desired time t+$T_{DL}$
$\mu_M(t)$: Current outgoing service rate at the M eNB
$\mu_S(t+T_{DL})$: Outgoing service rate at the SeNB at the desired time t+$T_{DL}$ Thus, the PDCP splitting is defined as forward PDCP PDUs to the UE via SeNB if:

$$D_M(t) > D_S(t+T_{DL}) + T_{DL}$$

Else the PDCP PDUs are forwarded to the UE 100 directly from the MeNB over the wireless link 110A.

This decision is taken at the MeNB PDCP Splitter (see, FIG. 4), i.e. the MeNB needs to estimate its own queuing time for the time t and the SeNB queuing time for the desired time t+$T_{DL}$ (delay-compensated estimation).

The queue state at the MeNB and SeNB will hereinafter be analyzed based on a fluid flow approximation. Thus, a deterministic fluid model is formulated based on feedback information in order to calculate the queue state and therefore to calculate the queuing times. This deterministic fluid model can be defined as stable since all the processing rates are deterministic.

Figure 5:
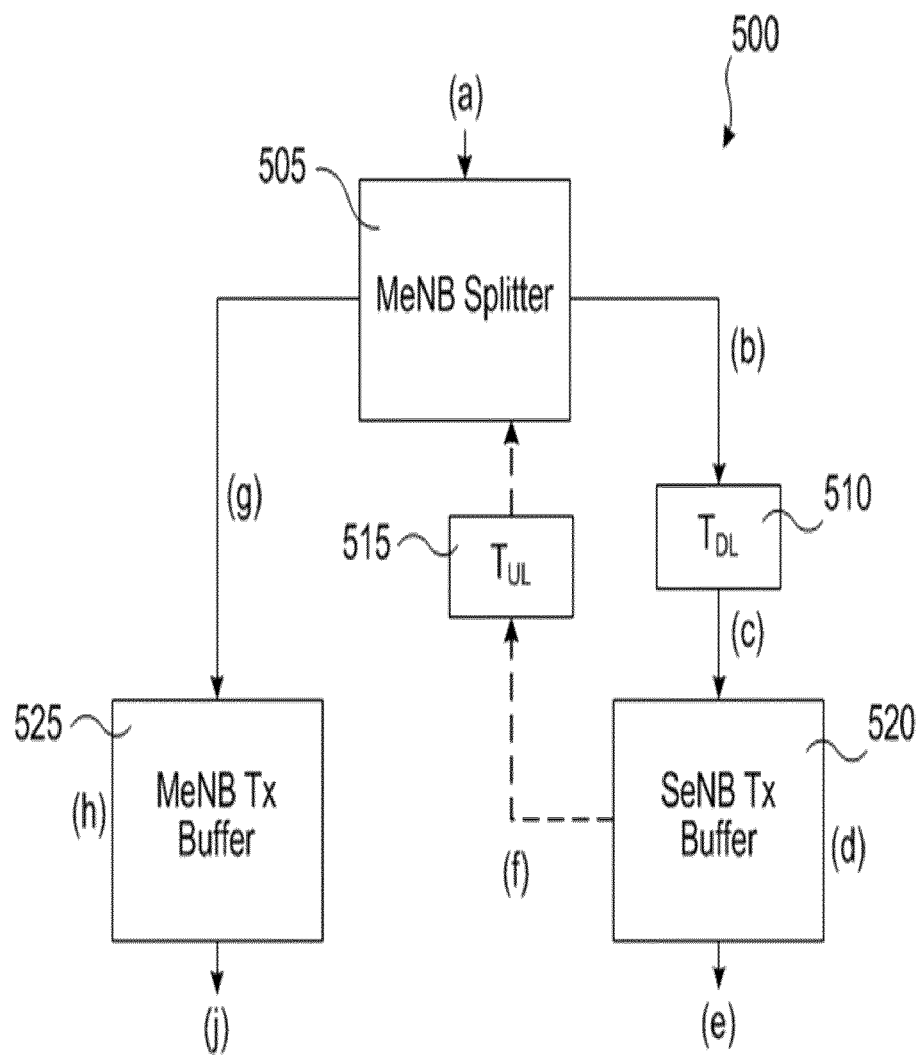
FIG. 5 is a block diagram illustrating an embodiment of a method.

FIG. 5 is a block diagram 500 of the deterministic fluid model and comprises an MeNB splitter module 505, a first delay module 510 representing a delay $T_{DL}$, an SeNB transmission buffer module 520, a second delay module 515 representing a delay $T_{UL}$, and an MeNB transmission buffer 525. FIG. 5 schematically further illustrates at (a)-(j) real-valued variables involved in the deterministic fluid model used, where (a): incoming traffic from higher layers (b):

$$r_{DL,M}(t) = \frac{dq^O_{DL,M}(t)}{dt}$$

downlink SN rate, currently outgoing from M eNB (c): $r_{DL,S}(t) = r_{DL,M}(t-T_{DL})$ current data arrival rate at SeNB (d): $q_S^O(t)$ queue data volume (buffer size) at SeNB (e):

$$\frac{dq_S^O(t)}{dt}$$

outgoing data rate from SeNB (f): feedback (g): $r_M(t)$ current data rate at M eNB (h): $q_M^O(t)$ queue data volume (buffer size) at MeNB (j):

$$\frac{dq_M^O(t)}{dt}$$

outgoing data rate from M eNB

The fluid flow approximation for the SeNB queue can be formulated as:

$$\frac{dq_S^O(t)}{dt} = \begin{cases} 0; & \text{if } q_S^O(t) = 0 \text{ and } r_{DL,M}(t-T_{DL}) - \mu_S < 0 \\ r_{DL,M}(t-T_{DL}) - \mu_S; & \text{otherwise } (q_S^O(t) > 0) \end{cases}$$

Then, the SeNB queue state can be determined as follows:

$$q_S^O(t) = \int_0^t (r_{DL,M}(\tau - T_{DL}) - \mu_S)d\tau \quad (1)$$

$$q_S^O(t) = q_S^O(0) + \int_0^t r_{DL,M}(\tau - T_{DL})d\tau - \mu_S * t$$

where $q_S^O(0)$ is the initial SeNB queue state.

If $q_S^O(0)=0$ and $r_{DL,M}(t-T_{DL})=\mu_S$, then $q_S^O(t)=0$ therefore, $D_S(t)=0$ (100% buffer utilization, i.e. no queuing delay)

Similarly, the MeNB fluid flow approximation (no inter-node delay) can be formulated as follows:

$$\frac{dq_M^O(t)}{dt} = \begin{cases} 0; & \text{if } q_M^O(t) = 0 \text{ and } r_M(t) - \mu_M < 0 \\ r_M(t) - \mu_M; & \text{otherwise } (q_M^O(t) > 0) \end{cases}$$

Then, the MeNB queue state can be determined as follows:

$$q_M^O(t) = \int_0^t (r_M(\tau) - \mu_M)d\tau \quad (2)$$

$$q_M^O(t) = q_M^O(0) + \int_0^t r_M(\tau)d\tau - \mu_M * t$$

where $q_M^O(0)$ is the initial MeNB queue state.

If $q_M^O(0)=0$ and $r_M(t)=\mu_M(t)$, then $q_M^O(t)=0$ therefore, $D_M(t)=0$ (100% buffer utilization, i.e. no queuing delay)

Since there is not any backhaul delay, the MeNB can determine directly its own queue state at any time t.

In order to determine the queue delays, the MeNB needs to determine first the queue states based on the deterministic fluid equations (1) and (2). For this, the MeNB takes into consideration the feedback information, outgoing data rates and sequence numbers of the transmitted packets from MeNB to SeNB. Hence, the method can further comprise receiving, by the MeNB 120A from the SeNB 120B, current queue data volume at the SeNB (120B) and current outgoing service rate at the SeNB 120B, and wherein the delay is based on the current queue data volume and the current outgoing service rate.

Figure 6:
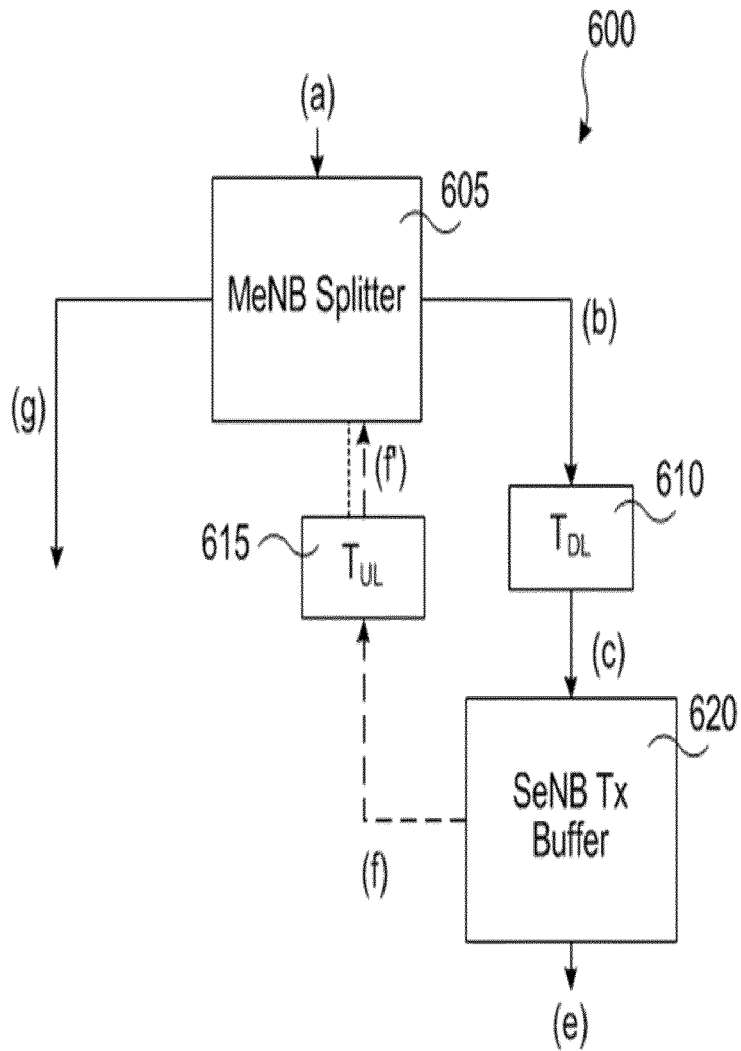
FIG. 6 is a block diagram illustrating an embodiment of a method.

The feedback information can include:

$q_S^O(t)$: Current queue data volume (Buffer Size) at the SeNB $\mu_S(t)$: Current outgoing service rate at the SeNB Thus, in one embodiment, the SeNB queue state based on equation (1) can be determined by the MeNB at the current time t as follows:

Assuming $T_{DL}=T_{UL}$ and $\mu(t)$ constant over $t-T_{DL}$ until t $q_{S,M}^O(t)=\int_0^t (r_{DL,M}(\tau-T_{DL}) - \mu_S(t))d\tau$ $q_{S,M}^O(t)=q_S^O(t-T_{UL})+\int_{t-T_{UL}}^t r_{DL,M}(\tau-T_{DL})d\tau-\mu_S(t)*T_{UL}$ (3)

where $q_{S,M}^O(t)$ is the current SeNB queue state determined by the M eNB $q_S^O(t-T_{UL})$ is the reported SeNB queue state received by the M eNB FIG. 6 is a block diagram 600 of the feedback part of the deterministic fluid model illustrated in FIG. 5 and comprises an MeNB splitter module 605, a first delay module 610 representing a delay $T_{DL}$, an SeNB transmission buffer module 620, and a second delay module 615 representing a delay $T_{UL}$. FIG. 6 schematically further illustrates at (a)-(g) real-valued variables involved in the deterministic fluid model used:

(a): incoming traffic from higher layers (b):

$$r_{DL,M}(t) = \frac{dq^O_{DL,M}(t)}{dt}$$

(c): $r_{DL,S}(t)=r_{DL,M}(t-T_{DL})$
(d): $q_S^Q(t)$
(e):

$$\frac{dq_S^Q(t)}{dt}$$

(f): sent feedback; $q_S^Q(t)$, $\mu_S(t)$
(f'): received feedback; $q_S^Q(t-T_{UL})$, $\mu_S(t-T_{UL})$
(g): $r_M(t)$ $T_{DL}=T_{UL}$ is assumed based on FIG. 6. Thus, at the MeNB the SeNB queue state can be determined based on the relation between the received feedback information (generated at $t-T_{UL}$) and the current data arrival rate at the SeNB (sent by the MeNB at $t-T_{DL}$). Hence, the method can further comprise determining, by the MeNB 120A, an expected queue data volume $q_{S,M}^Q(t+T_{DL})$ at the SeNB 120B based on a delay adjusted received current queue data volume at the SeNB 120B, outgoing data rate at the MeNB 120A towards the SeNB 120B, and delay adjusted outgoing service rate at the SeNB towards the UE 100.

From equation (3), $\int_{t-T_{UL}}^{t} r_{DL,M}(\tau-T_{DL})d\tau$ represents the total number of packets that were in-flight over the backhaul at the feedback generation time $t-T_{UL}$; i.e. those that are already at the SeNB for the current time t.

Thus, this integral can be determined with the estimation of the sequence number (SN) of the latest packet that arrived already at the SeNB at the time t (i.e., $q_S^{UpperQ}(t)$) and the respective SN of the latest packet that arrived at the SeNB at the time $t-T_{UL}$ (i.e., $q_S^{UpperQ}(t-T_{UL})$).

Further, define $$\int_{t-T_{UL}}^{t} r_{DL,M}(\tau-T_{DL})d\tau = q_S^{UpperQ}(t) - q_S^{UpperQ}(t-T_{UL}) \quad (4)$$

$$q_S^{UpperQ}(t-T_{UL}) = \int_0^{t-T_{UL}} r_{DL,M}(\tau-T_{DL})d\tau = q_{DL,M}(t-T_{UL}-T_{DL}) \quad (5)$$

$$q_{S,M}^{UpperQ}(t) = \int_0^t r_{DL,M}(\tau-T_{DL})d\tau = q_{DL,M}(t-T_{DL}) \quad (6)$$

where
$q_{DL,M}(t-T_{UL}-T_{DL})$ is the SN of the latest packet sent by theM eNB at the time $t-T_{UL}-T_{DL}$ $q_{DL,M}(t-T_{DL})$ is the SN of the latest packet sent by theM eNB at the time $t-T_{DL}$
Replacing equations (5) and (6) in equation (4), yields:

$$\int_{t-T_{UL}}^{t} r_{DL,M}(\tau-T_{DL})d\tau = q_{DL,M}(t-T_{DL}) - q_{DL,M}(t-T_{UL}-T_{DL}) \quad (7)$$

Then, replacing equation (7) in equation (3), yields:

$$q_{S,M}^Q(t) = q_S^Q(t-T_{UL}) + q_{DL,M}(t-T_{DL}) - q_{DL,M}(t-T_{UL}-T_{DL}) - \mu_S(t)*T_{UL} \quad (8)$$

From equation (8), $\mu_S(t)$ is unknown by the MeNB and changes according to the SeNB scheduler, so it can be demanding to estimate its behavior. Likewise, since this deterministic model avoids complex processes, cross-layers operations are not considered (i.e. scheduler (MAC) behavior is not explicitly considered, for the splitting on PDCP layer). Therefore, $\mu_S(t)=\mu_S(t-T_{UL})$ (its latest reported value within the feedback information) is a good estimation of $\mu_S(t)$. An even better estimation can be calculated based on scheduling algorithms integrated during the PDCP splitting process (not considered herein).

Thereby, the MeNB can determine the SeNB queue state at the current time as follows:

$$q_{S,M}^Q(t) = q_S^Q(t-T_{UL}) + q_{DL,M}(t-T_{DL}) - q_{DL,M}(t-T_{UL}-T_{DL}) - \mu_S(t-T_{UL})*T_{UL} \quad (9)$$

Nevertheless, since the MeNB needs to calculate $D_S(t+T_{DL})$ the MeNB needs to determine the SeNB queue state at the desired time $t+T_{DL}$.

Thus, in one embodiment, the MeNB can also determine based on equation (1) the SeNB queue state at the desired time time $t+T_{DL}$ as follows:

Assuming $T_{DL}=T_{UL}$ and $\mu(t+T_{DL})$ constant overt until $t+T_{DL}$ $$q_{S,M}^Q(t+T_{DL}) = \int_0^{t+T_{DL}} (r_{DL,M}(\tau)+\mu_S(t+T_{DL}))d\tau$$

$$q_{S,M}^Q(t+T_{DL}) = q_{S,M}^Q(t) + \int_t^{t+T_{DL}} r_{DL,M}(\tau)d\tau - \mu_S(t+T_{DL})*T_{DL} \quad (10)$$

where
$q_{S,M}^Q(t+T_{DL})$ is the SeNB queue state determined by the MeNBat the desired time $t+T_{DL}$ $q_S^Q(t)$ is the current SeNB queue state defined in equation (4)
From equation (10), $\int_t^{t+T_{DL}} r_{DL,M}(\tau)d\tau$ represents the total number of packets that are in-flight over the backhaul at the current time t; i.e. those that will be at the SeNB queue for the desired time $t+T_{DL}$. This integral can be determined with the estimation of the SN of the latest packet that arrived already at the SeNB at the time t (i.e., $q_S^{UpperQ}(t)$ calculated in equation (6)) and the SN of the latest packet that will arrive at the SeNB at the desired time $t+T_{DL}$; i.e. the SN of the latest packet sent by the MeNB at the current time t.

Define:

$$\int_t^{t+T_{DL}} r_{DL,M}(\tau-d\tau = q_{DL,M}(t) - q_S^{UpperQ}(t) = q_{DL,M}(t) - q_{DL,M}(t-T_{DL}) \quad (11)$$

From equation (10), $\mu_S(t+T_{DL})$ is again unknown by the MeNB. As described previously for $\mu_S(t)$, a good estimation is $\mu_S(t+T_{DL})=\mu_S(t-T_{UL})$.

Then, replacing equations (11) and (9) in equation (10), yields:

$$q_{S,M}^Q(t+T_{DL}) = q_S^Q(t-T_{UL}) + q_{DL,M}(t) - q_{DL,M}(t-T_{UL}-T_{DL}) - \mu_S(t-T_{UL})*T_{UL} - \mu_S(t-T_{UL})*T_{DL} \quad (12)$$

Assuming $T_{DL}=T_{UL}$ $$q_{S,M}^Q(t+T_{DL}) = q_S^Q(t-T_{UL}) + q_{DL,M}(t) - q_{DL,M}(t-T_{UL}-T_{DL}) - 2*\mu_S(t-T_{UL})*T_{DL} \quad (13)$$

Hence, the queue data volume at time $t+T_{DL}$ at the SeNB 120B can be determined as a sum of received current queue data volume at the SeNB 120B, data volume forwarded to the internode interface for transmission to the SeNB 120B during a time related to the delay, and queue data volume transmitted via the SeNB 120B to the UE 100 during a time related to the delay.

Thereby, from the final deterministic flow model equations (12) and (13), the MeNB can estimate its own expected queuing time and the SeNB expected queuing time for the desired packet to be transmitted to the UE as follows:

$$D_M(t) = \frac{q_M^Q(t)}{\mu_M(t)}; \quad D_S(t+T_{DL}) = \frac{q_{S,M}^Q(t+T_{DL})}{\mu_S(t-T_{DL})} \quad (14)$$

Here, $\mu_M(t)$ is the expected outgoing service rate at the MeNB if the packets are transmitted via the MeNB Tx buffer. Since this rate changes also depending on its scheduler (MAC layer), the MeNB can use its latest known rate as a good estimation.

From equation (14), the MeNB splitter forwards the desired packet to the UE 100 via the SeNB if $D_M(t) > D_S(t+T_{DL})+T_{DL}$. Else the desired packet is transmitted directly by the MeNB over the wireless link 110A. The forwarding decision may thus depend on what was sent via the internode interface 135A, 135B to the SeNB (what is in flight), the reported size of the buffer at the SeNB, what is going out of the buffer at the SeNB to the UE, and considering the delay of the internode interface 135A, 135B.

The objective of considering the information above in the forwarding decision of PDCP PDUs is eventually to balance the data queueing at MeNB 120A and SeNB 120B. At the end of a download session the method as explained above defines the means to empty both queues 404A, 404B substantially at the same time. This way, for the end user, it looks like a constant bitrate is provided by the aggregation of the carriers. Since no data is stuck in one queue while the other queue is already emptied, the total download time is decreased. Furthermore, a delay compensated PDCP buffer splitting is described, to estimate the queueing in SeNB correctly and thus make correct PDCP buffer splitting decisions, eventually leading to a higher end user performance.

FIG. 7A is a block diagram illustrating the MeNB 120A, with its components arranged for control a flow of PDCP PDUs in a split bearer environment according the method illustrated above. The MeNB 120A can be implemented as a physical node or as a virtualized entity in e.g a cloud solution or Software Defined Network (SDN).

The MeNB 120A comprises:
- a processor module 701 arranged to process program instructions;
- a memory module 702 arranged to store the program instructions and network parameters;
- an interface module 707 arranged to connect to other entities, such as to another eNB with an LTE X2 via interface 707A or an LTE S1 link towards a core node 150. Interface 707B might be a wireless interface to link to a UE 100 represented by link 110A;
- A timer module 703 e.g. for providing timestamps to the internode interface specific frames as specified above, to enable internode interface 135A, 135B timing measurement estimates by the SeNB 120B;
- A sequence number assigner module 704, to assign internode interface specific sequence numbers to the PDUs, as specified in 3GPP TS 36.425;
- A PDCP PDU queue module 702A, representing the logical queue 404A;
- A queue time obtainer module 705 for obtaining expected queuing times of PDCP PDUs at the MeNB 120A and at the SeNB 120B;
- A forwarding determiner module 706 for determining, according to the expected queuing times obtained by the queue time obtainer module 705, forwarding of a flow of PDCP PDUs destined for a UE 100;
- A data receiver module 708 (optional) for receiving, from the SeNB 120B, current queue data volume at the SeNB 120B and current outgoing service rate at the SeNB 120B;
- A queue volume determiner module 709 (optional) for determining an expected queue data volume $q_{S,M}^Q(t+T_{DL})$ at the SeNB 120B based on a delay adjusted received current queue data volume at the SeNB 120B, outgoing data rate at the MeNB 120A towards the SeNB 120B, and delay adjusted outgoing service rate at the SeNB 120B towards the UE 100;
- A delay obtainer module 710 (optional) for obtaining a delay of the internode interface 135A, 135B.

The processor module 701 is further arranged, under the program instructions, to control the interface module 707, the sequence number assigner module 704, the PDCP PDU queue module 702A, the queue time obtainer module 705, the forwarding determiner module 706, the (optional) data receiver module 708, the (optional) queue volume determiner module 709, and the (optional) delay obtainer module 710.

FIG. 7B is a block diagram illustrating the MeNB 120A, with its components arranged for control a flow of PDCP PDUs in a split bearer environment according the method illustrated above.

The MeNB 120A comprises:
- a processor module 701 arranged to process program instructions;
- a memory module 702 arranged to store the program instructions and network parameters;
- an interface module 707 arranged to connect to other entities, such as to another eNB with an LTE X2 via interface 707A or an LTE S1 link towards a core node 150. Interface 707B might be a wireless interface to link to a UE 100 represented by link 110A;

The Processor 701 comprises;
- A timer module e.g. for providing timestamps to the internode interface specific frames as specified above, to enable internode interface 135A, 135B timing measurement estimates by the SeNB 120B;
- A sequence number assigner module, to assign internode interface specific sequence numbers to the PDUs, as specified in 3GPP TS 36.425;
- A PDCP PDU queue module, representing the logical queue 404A;
- A queue time obtainer module for obtaining expected queuing times of PDCP PDUs at the MeNB 120A and at the SeNB 120B;
- A forwarding determiner module for determining, according to the expected queuing times obtained by the queue time obtainer module, forwarding of a flow of PDCP PDUs destined for a UE 100.

The Processor 701 may further comprise;
- A data receiver module for receiving, from the SeNB 120B, current queue data volume at the SeNB 120B and current outgoing service rate at the SeNB 120B;
- A queue volume determiner module for determining an expected queue data volume at the SeNB 120B based on a delay adjusted received current queue data volume at the SeNB 120B, outgoing data rate at the MeNB 120A towards the SeNB 120B, and delay adjusted outgoing service rate at the SeNB 120B towards the UE 100;
- A delay obtainer module for obtaining a delay of the internode interface 135A, 135B.

The processor module 701 is further arranged, under the program instructions, to control the interface module 707, the sequence number assigner module, the PDCP PDU queue module, the queue time obtainer module, the forwarding determiner module, the (optional) data receiver module, the (optional) queue volume determiner module, and the (optional) delay obtainer module.

FIG. 8A is a block diagram illustrating the SeNB 120B, with its components arranged to cooperate in a flow control performed by a MeNB 120A, wherein both the MeNb 120A and SeNB 120B operate in a split bearer environment according the method illustrated above. The SeNB 120B can be implemented as a physical node or as a virtualized entity in e.g a cloud solution or Software Defined Network (SDN).

The SeNB 120B comprises:
- a processor module 801 arranged to process program instructions;
- a memory module 802 arranged to store the program instructions and network parameters;
- an interface module 807 arranged to connect to other entities, such as to another eNB with an LTE X2 via interface 807A or an LTE S1 link towards a core node 150. Interface 807B might be a wireless interface to link to a UE 100 represented by link 110B;
- A timer module 803 e.g. for enabling a delay estimates of the internode interface 135A, 135B with support of the timestamps of as provided to the internode interface specific frames as specified above;
- A delay detector module 805 for estimating the delay in relation to the internode interface 135A, 135B, and the delay in the queue of SeNB 120B;
- A PDCP PDU queue module 802A, representing the logical queue 404B, and
- A feedback transmitter module 806 for collecting and transmitting the feedback, as explained above, towards MeNB 120A.

The processor module 801 is further arranged, under the program instructions, to control the interface module 807, the timer module 803, the delay detector module 805, the PDCP PDU queue module 802A, and the feedback transmitter module 806.

FIG. 8B is a block diagram illustrating the SeNB 120B, with its components arranged to cooperate in a flow control performed by a MeNB 120A, wherein both the MeNb 120A and SeNB 120B operate in a split bearer environment according the method illustrated above.

The SeNB 120B comprises:
- a processor module 801 arranged to process program instructions;
- a memory module 802 arranged to store the program instructions and network parameters;
- an interface module 807 arranged to connect to other entities, such as to another eNB with an LTE X2 via interface 807A or an LTE S1 link towards a core node 150. Interface 807B might be a wireless interface to link to a UE 100 represented by link 110B;

The Processor 701 comprises;
- A timer module e.g. for enabling a delay estimates of the internode interface 135A, 135B with support of the timestamps of as provided to the internode interface specific frames as specified above;
- A delay detector module for estimating the delay in relation to the internode interface 135A, 135B, and the delay in the queue of SeNB 120B;
- A PDCP PDU queue, representing the logical queue 404B, and
- A feedback transmitter module for collecting and transmitting the feedback, as explained above, towards MeNB 120A.

The processor module 801 is further arranged, under the program instructions, to control the interface module 807, the timer module, the delay detector module, the PDCP PDU queue module, and the feedback transmitter module.

Figure 9:
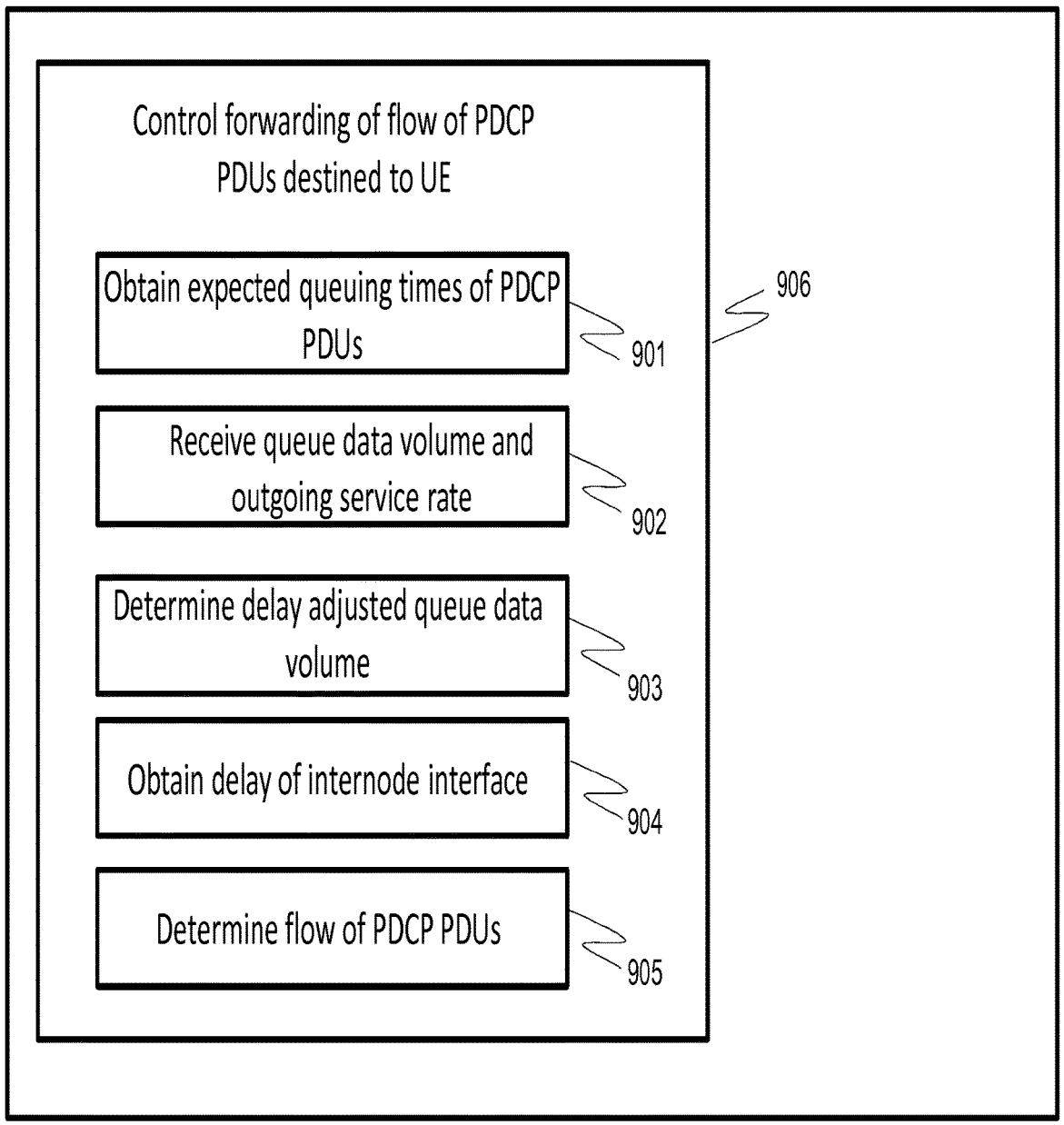
FIG. 9 is a block diagram illustrating an embodiment of modules.

FIG. 9 is a block diagram illustrating modules comprised by MeNb 120A.

The MeNB 120A can be implemented as a physical node or as a virtualized entity in e.g a cloud solution or Software Defined Network (SDN).

The MeNB 120A comprises a queue time obtainer module 901 for obtaining expected queuing times of PDCP PDUs at the MeNB 120A and at the SeNB 120B.

The MeNB 120A comprises a forwarding determiner module 906 for determining, according to the expected queuing times obtained by the queue time obtainer module 901, forwarding of a flow of PDCP PDUs destined for a UE 100.

The MeNB 120A comprises a data receiver module 902 (optional) for receiving, from the SeNB 120B, current queue data volume at the SeNB 120B and current outgoing service rate at the SeNB 120B.

The MeNB 120A comprises a queue volume determiner module 903 (optional) for determining an expected queue data volume $q_{S,M}{}^Q(t+T_{DL})$ at the SeNB 120B based on a delay adjusted received current queue data volume at the SeNB 120B, outgoing data rate at the MeNB 120A towards the SeNB 120B, and delay adjusted outgoing service rate at the SeNB 120B towards the UE 100.

The MeNB 120A comprises a delay obtainer module 904 (optional) for obtaining a delay of the internode interface 135A, 135B.

The delay obtainer module 901, the forwarding determiner module 906, the (optional) data receiver module 902, the (optional) queue volume determiner module 903, and the (optional) delay obtainer module 904 can be implemented in a flow controller module 906.

The method offers the advantage that at the end of a download session, both queues empty 404A, 404B substantially at the same time. This way, for the end user, it looks like a constant bitrate is provided by the aggregation of the carriers. Since no data is stuck in one queue while the other queue is already emptied, the total download time is decreased.

As feedback is frequently provided by the SeNb 120B to the MeNB 120A, changing conditions on the internode interface 135A, 135B (and optionally the queuing time), as defined above, in either the MeNB 120A or SeNB 120B, the flow controller in the MeNB 120A is enabled to change the flow control advantageously on a frequent basis.

One objective is to empty both queues at substantially the same moment. The fed back delays are applied in determining the queue 404A in the MeNB 120A in a portion 410A, 410B that represents the amount of PDCP PDUs that would not be submitted and acknowledged in time if these PDUs were forwarded to the SeNB 120B.

By partitioning the MeNB queue 404A in parts that are, and are not allowed to be forwarded to the SeNB 120B, the objective is advantageously achieved.

The invention claimed is:

1. A method performed by a first network node operating in a split bearer environment, the first network node being communicatively connected with a second network node via an internode interface, the method comprising the steps of:
   receiving one or more Packet Data Convergence Protocol (PDCP) Packet Data Units (PDUs) destined for a User Equipment (UE) and which may be forwarded to the UE by wireless transmission from the first network node or which may be forwarded by the first network node to the second network node for wireless transmission by the second network node to the UE;
   obtaining an expected queuing t time of PDCP PDUs at the first network node and an expected queuing time of PDCP PDUs at the second network node, the expected queuing time of PDCP PDUs at each of the first and second network nodes representing an expected time to be spent by a PDCP PDU waiting in a queue at the respective network node for wireless transmission to the UE; and determining forwarding of a flow of PDCP PDUs destined for the UE, based on the expected queuing time of PDCP PDUs at the first network node and based on the expected queuing time of PDCP PDUs at the second network node.

2. The method of claim 1, further comprising:
obtaining a delay of the internode interface, and wherein the delay is used for adjusting buffer queuing time of the flow of PDCP PDUs destined for the UE at the first network node and/or at the second network node.

3. The method of claim 2, wherein the flow of PDCP PDUs destined for the UE is forwarded on the internode interface to the second network node at any given time t only if the expected queueing time at the first network node at time t is larger than a sum of $T_{DL}$ and the expected queueing time at the second network node at time $t+T_{DL}$, where $T_{DL}$ is delay of the internode interface for packet transmission from the first network node to the second network node.

4. The method of claim 1, wherein the expected queuing times are used for determining forwarding of the flow of PDCP PDUs destined for the UE on the internode interface to the second network node.

5. The method of claim 1, wherein the expected queuing times are used for determining forwarding of the flow of PDCP PDUs destined for the UE on a wireless link from the first network node to the UE.

6. The method of claim 1, wherein the expected queuing time represents packet delay in relation to packet transmission for at least one of the first network node and the second network node.

7. The method of claim 6, wherein the packet delay is related to delay of the internode interface for packet transmission from the first network node to the second network node.

8. The method of claim 1, wherein the forwarding of the flow of PDCP PDUs destined for the UE further is determined according to delay of the internode interface for packet transmission from the first network node to the second network node.

9. The method of claim 7, wherein the delay of the internode interface is obtained at the first network node.

10. The method of claim 6, wherein the packet delay is related to delay of the internode interface for packet transmission from the second network node to the first network node and is determined at the first network node.

11. The method of claim 6, wherein the first network node requests the second network node to submit the delay for packet transmission from the first network node to the second network node to the first network node.

12. The method of claim 11, wherein the delay for packet transmission from the first network node to the second network node is determined based on timestamps associated with a PDCP PDU forwarded by the first network node on the internode interface, at least one of the timestamps being set by the first network node.

13. The method of claim 10, wherein the delay for packet transmission from the second network node to the first network node is determined based on timestamps associated with a feedback report transmitted by the second network node on the internode interface, at least one of the timestamps being set by the second network node.

14. The method of claim 1, wherein a fluid approximation is made to estimate buffer queuing states at the second network node, and wherein the fluid approximation relates to an incoming data rate of PDCP PDUs destined for the UE at the second network node and outgoing service rate at the second network node.

15. The method of claim 1, further comprising:
receiving, by the first network node from the second network node, current queue data volume at the second network node and current outgoing service rate at the second network node, and wherein the expected queuing time of PDCP PDUs at the second network node is based on the current queue data volume and the current outgoing service rate.

16. The method of claim 1, further comprising:
determining, by the first network node, an expected queue data volume at the second network node, based on a delay adjusted received current queue data volume at the second network node, outgoing data rate at the first network node towards the second network node, and delay adjusted outgoing service rate at the second network node towards the UE.

17. The method of claim 16, wherein the queue data volume at time $t+T_{DL}$ at the second network node, where $T_{DL}$ is a delay of the internode interface, is determined as a sum of received current queue data volume at the second network node, data volume forwarded to the internode interface for transmission to the second network node during a time related to the delay, and queue data volume transmitted via the second network node to the UE during a time related to the delay.

18. A first network node configured for operation in a split bearer environment, the first network node being configured for a communication with a second network node via an internode interface, the first network node comprising a wireless interface, an internode interface, a memory, and processing circuitry, wherein the processing circuitry is configured to cause the first network node to:
receive one or more Packet Data Convergence Protocol (PDCP) Packet Data Units (PDUs) destined for a User Equipment (UE) and which may be forwarded to the UE by wireless transmission from the first network node or which may be forwarded by the first network node to the second network node for wireless transmission by the second network node to the UE;
obtain an expected queuing t time of PDCP PDUs at the first network node and an expected queuing time of PDCP PDUs at the second network node, the expected queuing time of PDCP PDUs at each of the first and second network nodes representing an expected time to be spent by a PDCP PDU waiting in a queue at the respective network node for wireless transmission to the UE; and
determine forwarding of a flow of PDCP PDUs destined for the UE, based on the expected queuing time of PDCP PDUs at the first network node and based on the expected queuing time of PDCP PDUs at the second network node.

19. A mobile communication system comprising:
the first network node of claim 18,
the second network node of claim 18, wherein the second network node is configured for operation in the split bearer environment, the second network node being configured for the communication with the first network node via the internode interface, and
the UE of claim 18, wherein the UE is configured to receive PDCP PDUs from the first network node and the second network node as determined by the first network node according to the expected queuing times.

20. The system of claim 19, wherein the first network node is a Master e-NodeB (MeNB) and the second network node is a Secondary e-NodeB (SeNB) or wireless access point, wherein the MeNB and the SeNB operate in a Long Term Evolution (LTE) or LTE advanced technology and the wireless access point operates in a Wireless Local Area Network (WLAN).

* * * * *